(12) United States Patent
Irle

(10) Patent No.: US 9,221,358 B2
(45) Date of Patent: Dec. 29, 2015

(54) CONTROL DEVICE FOR CONTROLLING AN OPERATING DEVICE

(71) Applicant: Hella KGaA Hueck & Co., Lippstadt (DE)

(72) Inventor: Henning Irle, Lippstadt (DE)

(73) Assignee: HELLA KGAA HUECK & CO., Lippstadt (DE)

(*) Notice: Subject to any disclaimer, the term of this patent is extended or adjusted under 35 U.S.C. 154(b) by 0 days.

(21) Appl. No.: 14/262,322

(22) Filed: Apr. 25, 2014

(65) Prior Publication Data

US 2014/0324259 A1    Oct. 30, 2014

(30) Foreign Application Priority Data

Apr. 30, 2013   (DE) .................. 10 2013 104 374

(51) Int. Cl.
| | |
|---|---|
| *G01D 5/12* | (2006.01) |
| *B60L 15/00* | (2006.01) |
| *B60L 15/20* | (2006.01) |
| *B60K 31/02* | (2006.01) |
| *F02D 11/00* | (2006.01) |
| *G01B 7/00* | (2006.01) |

(52) U.S. Cl.
CPC .............. *B60L 15/20* (2013.01); *B60K 31/02* (2013.01); *F02D 11/00* (2013.01); *G01D 5/12* (2013.01); *G01B 7/003* (2013.01); *Y02T 10/7275* (2013.01)

(58) Field of Classification Search
USPC ........................................... 701/22
See application file for complete search history.

(56) References Cited

U.S. PATENT DOCUMENTS

| | | | | |
|---|---|---|---|---|
| 5,657,735 | A  * | 8/1997 | Maki et al. ..................... | 123/673 |
| 5,821,419 | A  * | 10/1998 | Mader et al. ..................... | 73/493 |
| 2008/0250882 | A1* | 10/2008 | Gallego et al. ................ | 73/865.8 |
| 2010/0191427 | A1* | 7/2010 | Brammer et al. ............... | 701/51 |
| 2010/0224435 | A1* | 9/2010 | Yamamori ..................... | 180/444 |

FOREIGN PATENT DOCUMENTS

| | | |
|---|---|---|
| DE | 3836914 A1 | 5/1990 |
| DE | 19714624 A1 | 11/1997 |
| DE | 10112033 A1 | 9/2001 |
| DE | 69627401 T2 | 3/2004 |
| DE | 102005033693 A1 | 3/2006 |
| DE | 102010020230 B4 | 3/2012 |

* cited by examiner

*Primary Examiner* — Yonel Beaulieu
(74) *Attorney, Agent, or Firm* — Husch Blackwell LLP

(57) ABSTRACT

A control device (10) for controlling an operating device (100), comprising an evaluation unit (20), a first position sensor unit (30a) for determining the position of a first component (130a) of the operating device (100) and a second position sensor unit (30b) for determining the position of a second component (130b) of the operating device (100). The evaluation unit (20) is connected to the position sensor units (30a, 30b) to permit signal communications and is constructed as a common evaluation unit (20) for evaluating the signals of the position sensor units (30a, 30b).

8 Claims, 4 Drawing Sheets

CONTROL DEVICE FOR CONTROLLING AN OPERATING DEVICE

CROSS REFERENCE

This application claims priority to German Patent Application No. 10 2013 104374.7 filed Apr. 30, 2013, and hereby incorporates this document by reference.

TECHNICAL DESCRIPTION OF THE INVENTION

The present invention relates to a control device for controlling an operating device and also to an operating device, in particular, for a vehicle.

It is known that, in principle, operating devices, in particular, for vehicles, must be monitored. Control devices are often used for this task. An operating device can be, e.g., the combination of an actuator and a gear mechanism, e.g., for a throttle blade of a vehicle. In a control loop, a target value for the position of the throttle blade is specified and then a corresponding actual value is set on the throttle blade by means of the rotation of the motor and the propagation via the gear mechanism. For this purpose it is necessary to detect the position of the throttle blade and the positioning of the motor. In known operating devices, control devices that determine the position of at least the throttle blade are provided for this purpose.

A disadvantage in known operating devices is that they are relatively complex in terms of regulation. This complexity can be reduced only by using simpler motors, in particular, brushed motors. The use of brushless motors would lead to increased complexity and thus to higher costs, because a second determination of position with regard to the corresponding current direction within the brushless motor would be necessary. The increased costs, however, do not permit use in high quantities in a vehicle. A second disadvantage of brushed motors is that the brushes are wear parts and therefore have a limited design life. In principle, such a position sensor system is known, e.g., from DE 10 2010 020 230 B4.

SUMMARY OF THE INVENTION

The problem of the present invention is to at least partially eliminate the disadvantages described above. In particular, the problem of the present invention is to disclose a control device and an operating device that provide a corresponding position sensor system for different components of the operating device in a cost-effective, in particular, wear-free and simple way.

The above problem is solved by a control device with the characteristics of Claim 1 and also by an operating device with the characteristics of Claim 8. Additional characteristics and details of the invention result from the dependent claims, the description, and the drawings. Here, characteristics and details that are described in connection with the control device according to the invention are obviously also applicable in connection with the operating device according to the invention and vice versa, so that, with respect to the disclosure, reference is or could always be made mutually to the individual aspects of the invention.

In one control device according to the invention, this is used for controlling an operating device. The control device has an evaluation unit and a first position sensor unit for determining the position of a first component of the operating device. A second position sensor unit is further provided for determining the position of a second component of the operating device. A control device according to the invention is distinguished in that the evaluation unit is connected to the position sensor units to allow signal communications and is constructed as a common evaluation unit for the evaluations of the signals of the position sensor units.

In contrast to known operating devices, e.g., for the use of brushless motors, this arrangement reduces the regulating complexity. Furthermore, there is still the possibility to determine the corresponding position of at least two components by means of at least two position sensor units. For the first component, e.g., this can involve the rotational position of the brushless motor. The second position of the second component advantageously involves the rotational position of the gear mechanism output, e.g., with reference to a throttle blade of a vehicle. In contrast to known operating devices or in contrast to known control devices, however, here the signal communications are performed with a common evaluation unit. This common evaluation unit can comprise, e.g., in the case of using multiplexing, a signal-communicating connection with all of the position sensor units. This leads to the possibility of evaluating and testing the resulting signals of all position sensor units for the corresponding relevance in a common evaluation unit. Here, an intervention in the corresponding control loop of the respective component can take place directly. It is also possible that a corresponding default parameter is generated in the evaluation unit and is input into the associated control loop of the corresponding component.

In comparison with known operating devices, a separate evaluation unit is thus at least eliminated. This leads to a clear reduction in the complexity of the overall control device. The reduction in complexity is associated with a reduction in costs, so that cost efficient advantages can be achieved.

The control device is here focused, in particular, on the individual control loops of the components. This allows, for example, the regulation of a brushless motor in the form of the first component and the regulation, e.g., of a throttle blade, as a second component of the operating device. Obviously, a control device according to the invention can also be used for operating devices that are provided as input devices, e.g., on the vehicle. Thus, the operating device can have individual, manual input control elements in which, e.g., for climate control of the vehicle, different areas of the vehicle can be provided with different target temperature values. Monitoring the rotational positions and thus detecting the changed target values are realized by means of the position sensor units of the control device. Then the detected positions of the individual components, that is, the individual input control elements, are evaluated in a common evaluation unit, so that the reduction in complexity here also leads to a significant cost advantage.

Through a control device according to the invention it is thus possible to achieve advantages in other components through the reduced complexity in the control device. In particular, for an operating device as the first component, a brushless motor can now also be used without increasing the complexity or costs. For input control elements, the same advantage can be achieved in the reverse sequence.

In particular, a control device according to the invention is used for the control of an operating device of a vehicle or a motor vehicle.

A control device is constructed, in particular, as a regulating device for regulating an operating device. It is used to make interventions in a control loop or to completely form this control loop, so that a regulation with an input parameter and a measured output parameter is provided. In particular, the position sensor units are constructed for determining a rotary position of each component. Obviously, three or even more position sensor units are also conceivable within the scope of the present invention.

It is advantageous if, in a control device according to the invention, the evaluation unit is constructed for a time-offset evaluation of the position sensor units, especially using multiplexing. In other words, the evaluation of a single position sensor unit is always performed at only one defined point in time or at one defined time span. These time spans can be specified so that the evaluation unit considers the next position sensor unit with regard to the evaluation after the end of a defined time span. In other words, the evaluation unit scans through the individual position sensor units, so that signal communications always take place with a clear allocation between a position sensor unit and the common evaluation unit. Depending on the regulation task that the control unit is being used for, different time spans and different dead times for the non-monitored position sensor units can be set accordingly. According to whether it is a regulation task with high safety relevance and high clock cycles or with low clock cycles and less safety relevance, the specified time spans are adapted accordingly. In particular, value is placed on a high repetition rate, so that, in relatively short time spans, e.g., of a few milliseconds, the evaluation unit is in the position to perform the corresponding evaluation of each position sensor unit connected to permit signal communications. This achieves further reduction of the complexity, especially with regard to the type and shape of the evaluation unit. Thus, through the one-to-one allocation, the data of all position sensor units does not have to be detected in parallel. This produces a cost advantage in the selection or construction of the evaluation unit.

It can likewise be an advantage when, in a control device according to the invention, at least one of the position sensor units is constructed according to one of the following physical-technical conversion methods:

Inductive
Capacitive
Magnetic

The preceding list is not an exhaustive list. Preferably, an inductive or capacitive physical-technical conversion method is used. An inductive, physical-technical conversion method is understood to be the use of a so-called CIPOS structure with a receiver coil and an excitation coil. Thus, e.g., a rotating element punched from sheet metal is placed on the respective component that is excited inductively by the excitation coil. The receiver coil detects a corresponding rotational movement or the corresponding rotational position of this excited component and can provide feedback on the position accordingly. Capacitive or magnetic sensors, e.g., Hall sensors, could also be used in the scope of the present invention. Obviously it is possible that different position sensor units are combined with each other in a control device according to the invention. It is preferred, however, when all of the position sensor units use the same or essentially the same physical-technical conversion method. This involves, in particular, an inductive conversion method for all position sensor units.

It can likewise be advantageous when, in a control device according to the invention, the position sensor units are constructed as inductive position sensor units, wherein for at least two position sensor units a common excitation coil is formed or the excitation coils are implemented in at least two locations but are connected electrically in series. As already explained in the preceding section, the excitation coil excites a corresponding sheet metal part fastened to the component. The excitation can only be performed in common here, so that a single common excitation coil is formed for an essentially arbitrary number of position sensor units. This reduces the costs with regard to the production of the position sensor units and simultaneously also the necessary spatial requirements. Especially if the components to be monitored are spatially close by, such an embodiment can be used with large cost reductions.

It is further advantageous, in a control device according to the invention, when the position sensor units are arranged relative to each other in a plane, especially on a common printed circuit board. A printed circuit board (PCB) can be produced in an especially cost-effective way and in this way can be installed, above all, especially easily and quickly. For example, the control device can be formed essentially completely on this printed circuit board. The printed circuit board can then be inserted with corresponding connector contacts into a mating connector, e.g., on a vehicle. Especially for the monitoring of worm gears as one of the two components, in this way especially simple and cost-effective structures of the control device are achieved. The spatial form of the entire control device can be concentrated in an especially simple way on the plate-shaped structure of the printed circuit board.

Likewise it is further advantageous when, in a control device according to the invention, a transmission ratio between the first component and the second component is stored in the evaluation unit or in a downstream unit on a systematically higher plane, wherein this transmission ratio is used for ensuring the defined positions. There are use situations for control devices that require a redundant design for reasons of safety. With such safety situations, separate position sensor units were previously used and their corresponding measurement results were compared with each other for plausibility. In a control device according to the invention, the result of the two basically already necessary position sensor units can also be used for a dynamic redundancy. If, e.g., a motor as the first component rotates, then this rotation is also converted via the transmission ratio into a rotation of the gear mechanism end, that is, of the second component. The result of the rotation is pre-defined by the transmission ratio. By determining the rotational positions of the motor at the beginning of the gear mechanism and at the end of the gear mechanism, that is, of the second component, a comparison between the two defined positions and the calculated relationship via the transmission ratio can be performed simultaneously. Due to the fact that this takes place only during or in comparison before and after a movement of the gear mechanism, this is designated as dynamic redundancy.

Another advantage is if, in a control device according to the invention, the evaluation unit is constructed as an integrated circuit in the form of an IC (integrated circuit). This is to be understood as an especially simple and cost-effective construction. Such so-called ICs are standard electronic components and can be placed cost-effectively and above all with minimal dimensions, e.g., on a printed circuit board. On such a printed circuit board, conductor tracks that guarantee the signal-communicating connection between the integrated circuit and the respective position sensor unit are arranged accordingly.

The subject of the present invention is also an operating device, especially for a vehicle, having a first component and a second component that can move relative to the first component. The operating device further has a control device. The operating device according to the invention is distinguished in that the control device has the characteristics according to the invention. Accordingly, an operating device according to the invention provides the same advantages as those explained in detail with reference to a control device according to the invention. The two components are, in particular, actuators or motors. The individual components are, in particular, components with rotary movement, so that rotary positions can be determined by means of the position sensors. A dependency of the individual actuators on each other, e.g., by means of their mechanical coupling with the help of a gear mechanism, is also conceivable in the sense of the present invention. It is further possible that a target value can also be input by actuators as components, as will be explained below. In particular, the operating device is used for control elements of a motor vehicle. These can be, for example, the control elements of an air conditioning system, by means of which temperatures or fan stages or discharge directions can be set.

An operating device according to the invention can be improved such that the first component is formed as a motor, especially as a brushless motor, and the second component is formed as an actuator of a gear mechanism coupled with the motor. This can involve, e.g., a use of an operating device for a throttle blade, a turbocharger, or, e.g., the shutter of a cooling grating. By means of the motor, a rotational set point is forwarded to the gear mechanism, wherein the gear mechanism transmits this rotational set point to the respective actuator. Monitoring is performed with regard to the position of the motor and with regard to the position of the actuator, so that a regulating intervention can take place for both components. The brushless motor is regulated with regard to the necessary current direction of the excitation through an electrical control loop. This receives its input information, that is, determining the actual values, from the first position sensor unit. The actuator, e.g., the throttle blade of a motor, is monitored with the second position sensor unit, so that also this control loop receives its actual value input parameters through the same control device with the common evaluation unit.

It is further advantageous if, in an operating device according to the invention, the first component and the second component are formed as input control elements for the manual input of target values for a regulating system. For example, in vehicles, input regulators are known that can be set for different temperature target values for different zones of the vehicle. If this input regulator is rotated by hand, then this target value must be forwarded to the corresponding control loop as a set point. In known operating devices, potentiometers are often used here. These are associated, just like brushed motors, with problems with regard to the touching contact, because they are subject to wear and can possibly have problems due to out-gassing of insulation layers if they are not used for a long time. In an operating device according to the invention, the input positions can be determined by means of position sensors, in particular, in a non-contact way, with regard to their rotational position. This can be performed cost-effectively and simply because the individual position determination can be performed with a common evaluation unit. In the non-automotive area, the same approach can be used for specifying the target temperature for cooking plates and ovens, the type of heat (top heat, bottom heat, air circulation, etc.) and the fan speed for the circulating air fan in the oven. Also in washing machines, dryers, and kitchen appliances, the operating device according to the invention can be used, resulting in reduced costs and increased reliability and lifetime.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1:
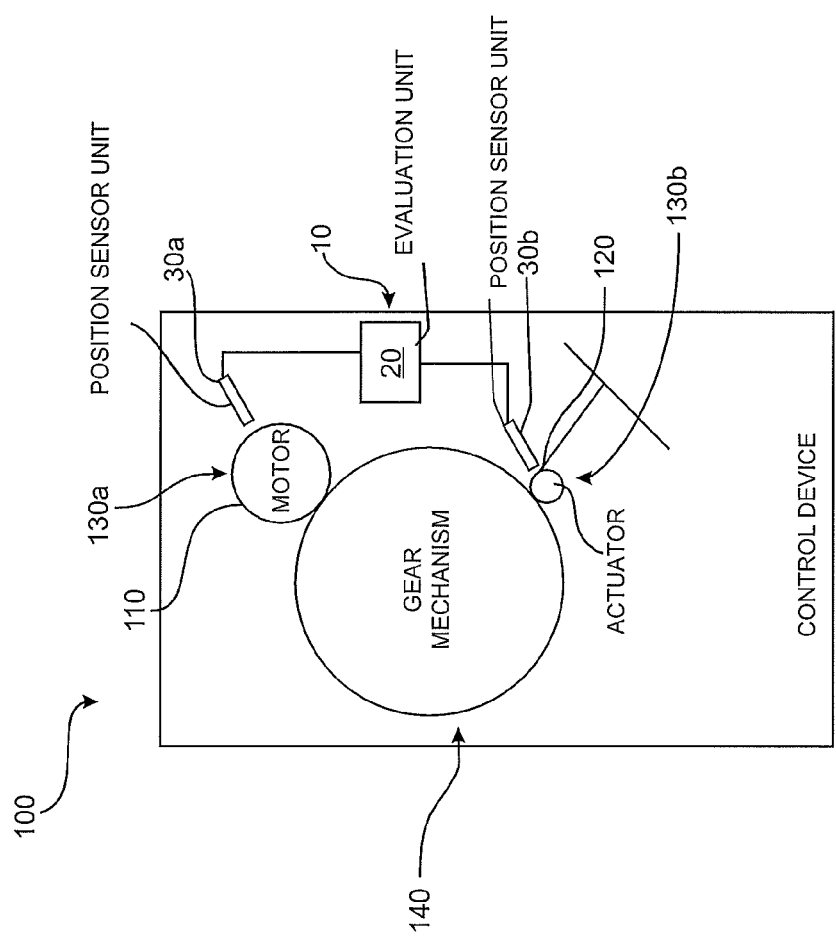
FIG. 1: a first embodiment of an operating device according to the invention.

FIG. 1 shows a first embodiment of an operating device 100 according to the invention. Here, the first component 130a is constructed as motor 110. The second component 130b involves an actuator 120, e.g., in the form of a throttle blade of a vehicle. The motor 110 and the actuator 120 are coupled with each other mechanically by means of a gear mechanism 140 not shown in more detail. When the motor 110 that is constructed, in particular, as a brushless motor turns, this rotation is converted by means of the gear mechanism 140 into a rotation of the actuator 120.

In the embodiment of the operating device 100 of FIG. 1, a control device 10 is provided. This has two position sensor units 30a and 30b that are formed, in particular, using an inductive physical-technical conversion method. The first position sensor unit 30a here monitors the rotary position of the first component 130a, that is, of the motor 110. Here the regulated control of the motor 110 with respect to its brushless construction and thus the excitation direction can be realized by means of the common evaluation unit 120. The rotational position of the actuator 120 is detected by means of the second position sensor unit 30b. Here, the control loop can be monitored or specified overall by means of the common evaluation unit 20, so that the actual value of the regulation on the actuator 120 can be monitored by means of the first position sensor unit 30a.

Figure 2:
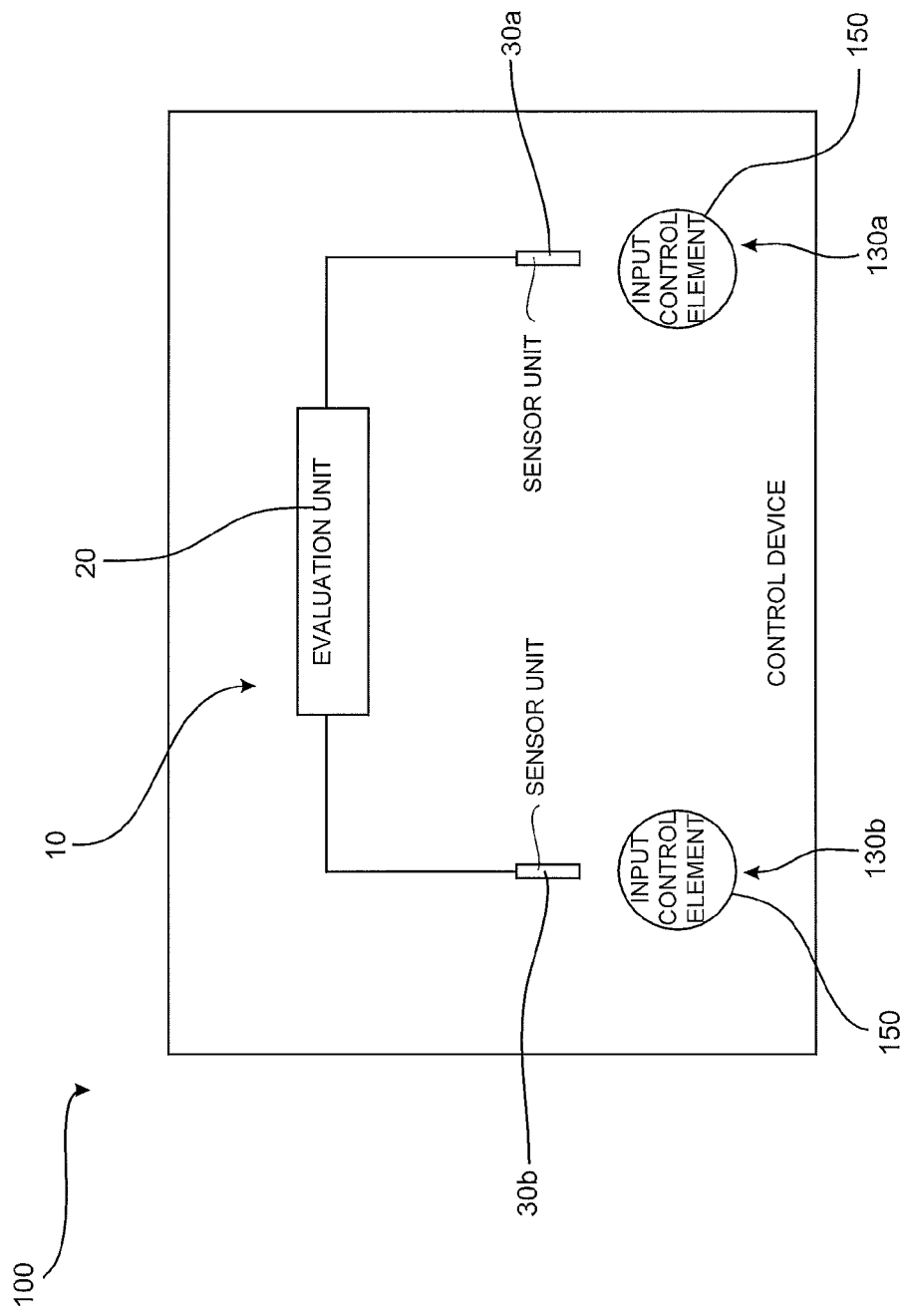
FIG. 2: another embodiment of an operating device according to the invention.

FIG. 2 shows another embodiment of an operating device 100 according to the invention. This involves an input capability, e.g., for the climate control system of a vehicle. A first component 130a and a second component 130b are provided that are both constructed as input control elements 150 in the form of rotational regulators. Here, for the components 130a and 130b, position sensor units 30a and 30b, are provided, respectively, advantageously using an inductive method. There is a signal-communicating connection of the position sensor units 30a and 30b to the evaluation unit 20 of the control device 10. If a user of the vehicle manually rotates one of the components 130a and 130b, that is, the input control elements 150, then this change in the rotational position is detected by means of the position sensor units 30a and 30b and forwarded to the common evaluation unit 20. A corresponding intervention in the subsequent climate control is performed there so that the changed target values can be input into the control loop.

Figure 3:
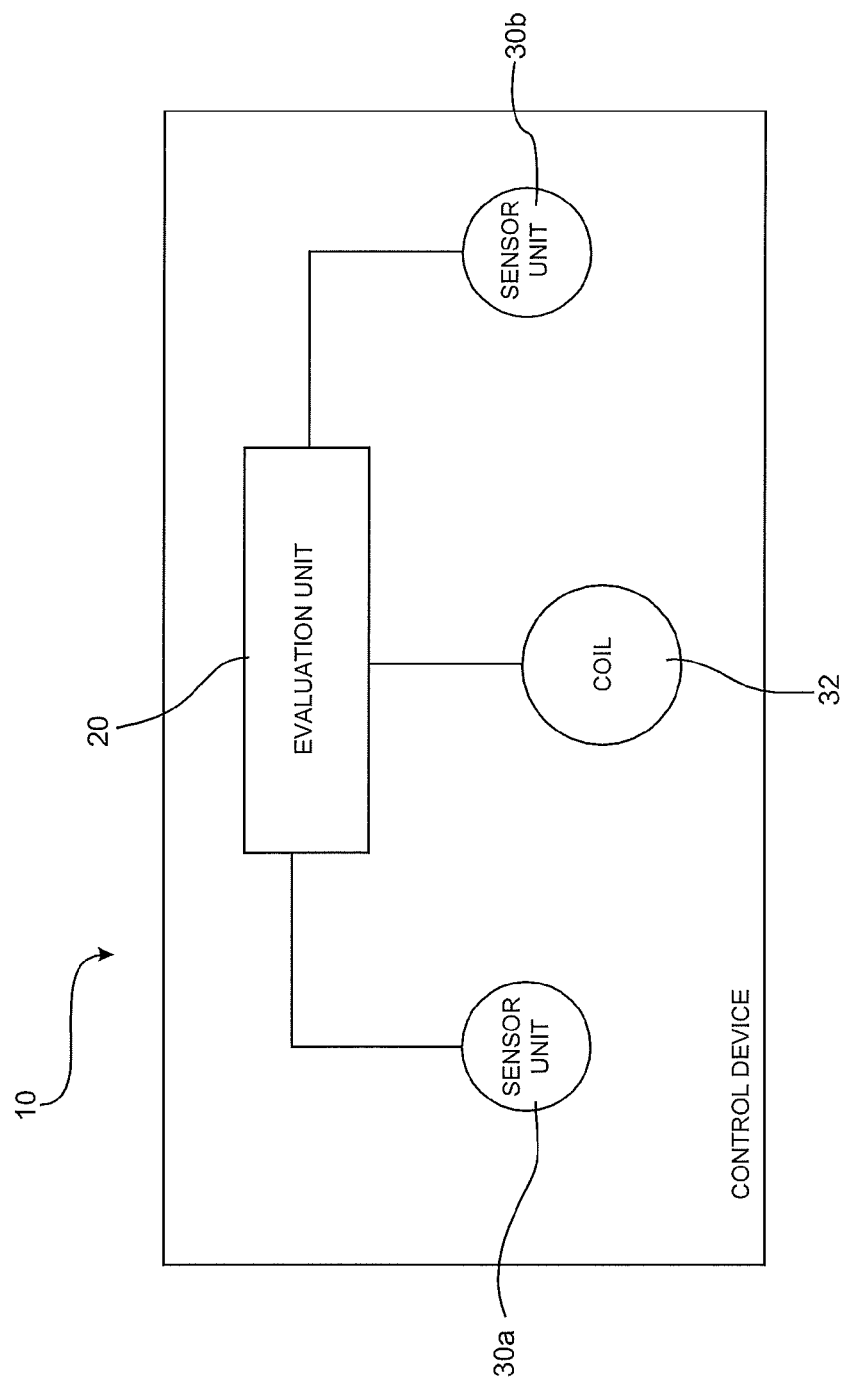
FIG. 3: an embodiment of a control device according to the invention.

FIG. 3 shows an embodiment of a control device 10 according to the invention. Here, the two position sensor units 30a and 30b are formed using an inductive method. However, for reducing the complexity and costs, they have a common excitation coil 32 that is positioned centrally and somewhat enlarged between the two position sensor units 30a and 30b.

Figure 4:
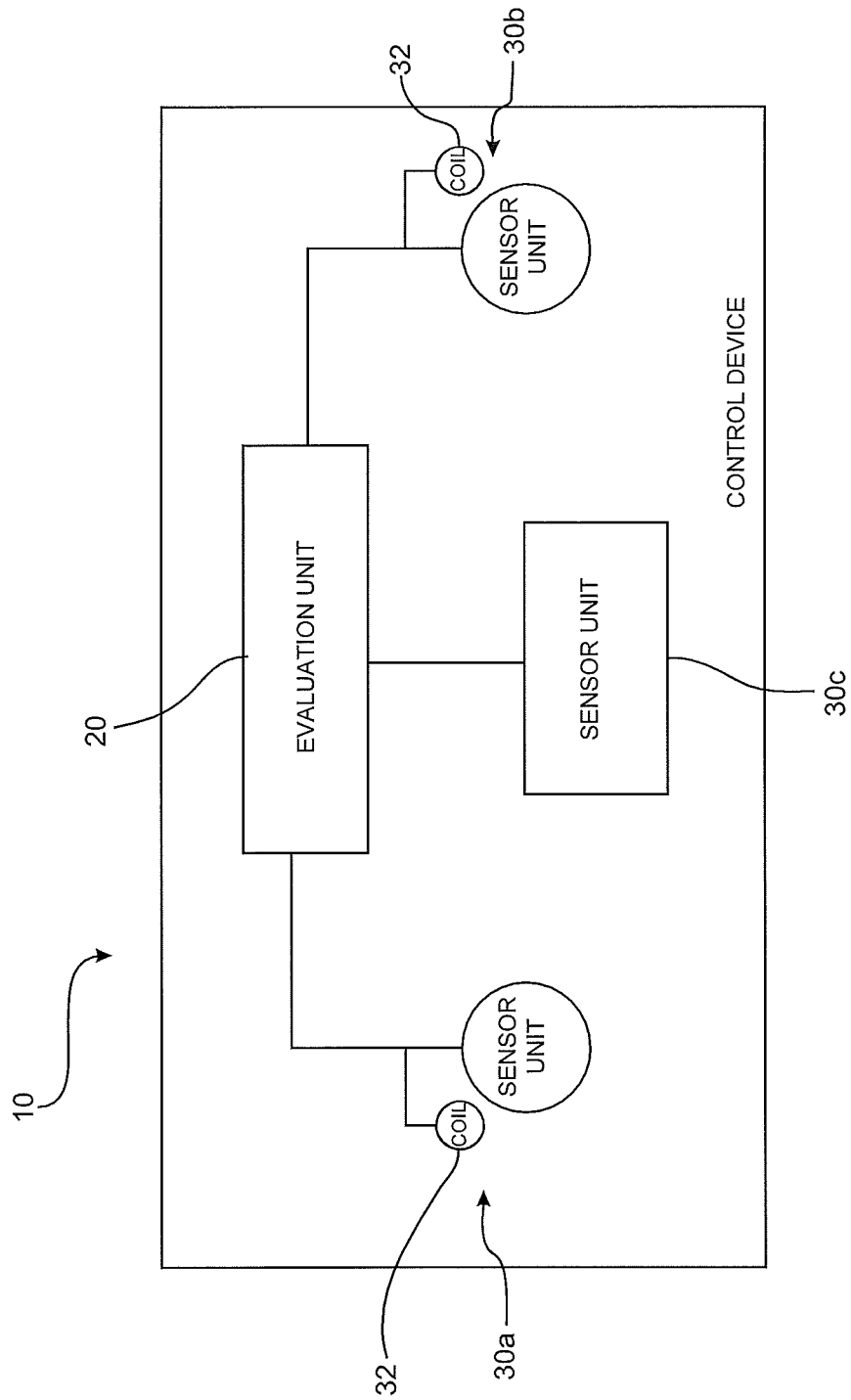
FIG. 4: another embodiment of a control device according to the invention.

FIG. 4 shows another variant of a control device according to the invention. Here, each inductive position sensor unit 30a and 30b has a separate excitation coil 32. However, another third position sensor unit 30c is also provided that is constructed here, e.g., using a capacitive method.

The previous explanation of the embodiments describes the present invention exclusively within the framework of examples. Obviously, individual features of the embodiments, if technically useful, can be combined freely with each other without leaving the scope of the present invention.

LIST OF REFERENCE SYMBOLS

10 Control device
20 Evaluation unit
30a First position sensor unit
30b Second position sensor unit
30c Third position sensor unit
32 Excitation coil
40 Printed circuit board
100 Operating device
110 Motor
120 Actuator
130a First component
130b Second component
140 Gear mechanism
150 Input control element

The invention claimed is:

1. A control device controlling an operating device, comprising:
    an evaluation unit,
    a first inductive position sensor for determining the position of a first component of the operating device, and
    a second inductive position sensor for determining the position the position of a second component of the operating device, and
    at least one of:
        a common excitation coil for at least said first and second position sensors, and
        excitation coil for each of the first and second position sensors, wherein said excitation coils are connected electrically in series;
    wherein the evaluation unit is connected to the position sensors to allow signal communications and is constructed for the evaluation of the signals of the position sensors as a common evaluation unit.

2. The control device according to claim 1, wherein the evaluation unit is constructed for a time-offset evaluation of the position sensors using multiplexing.

3. The control device according to claim 1, wherein the position sensors are arranged in a plane relative to each other on a common printed circuit board.

4. The control device according to claim 1, wherein a transmission ratio between the first component and the second component is at least one of stored and used in the evaluation unit and this transmission ratio is used to ensure the defined positions.

5. The control device according to claim 1, wherein the evaluation unit is constructed as an integrated circuit in the form of an IC.

6. An operating device, in particular, for a vehicle, comprising: a first component and a second component that can move relative to the first component, and further comprising a control device as recited in claim 1.

7. An operating device according to claim 6, wherein the first component is constructed as a brushless motor and the second component is constructed as an actuator of a gear mechanism coupled with the motor.

8. An operating device according to claim 6, wherein the first component and the second component are constructed as input control elements for the manual input of target values for a regulating or controlling system.

* * * * *